US009256582B2

(12) United States Patent
Caten

(10) Patent No.: US 9,256,582 B2
(45) Date of Patent: Feb. 9, 2016

(54) CONVERSION OF A PRESENTATION TO DARWIN INFORMATION TYPING ARCHITECTURE (DITA)

(71) Applicant: International Business Machines Corporation, Armonk, NY (US)

(72) Inventor: Lisa M. Caten, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 13/658,069

(22) Filed: Oct. 23, 2012

(65) Prior Publication Data

US 2014/0115442 A1    Apr. 24, 2014

(51) Int. Cl.
G06F 17/00      (2006.01)
G06F 17/22      (2006.01)
G06F 17/30      (2006.01)
G06F 9/45       (2006.01)

(52) U.S. Cl.
CPC .......... *G06F 17/2247* (2013.01); *G06F 17/227* (2013.01); *G06F 8/427* (2013.01); *G06F 17/30781* (2013.01)

(58) Field of Classification Search
CPC ........................ G06F 17/2247; G06F 17/30781
See application file for complete search history.

(56) References Cited

U.S. PATENT DOCUMENTS

| | | | |
|---|---|---|---|
| 7,065,588 B2 | 6/2006 | Konda et al. | |
| 7,398,464 B1 * | 7/2008 | Wei et al. | 715/239 |
| 7,921,137 B2 * | 4/2011 | Lieske et al. | 707/802 |
| 8,756,232 B1 * | 6/2014 | Ringhiser et al. | 707/738 |
| 2004/0221228 A1 * | 11/2004 | Day et al. | 715/513 |
| 2005/0041872 A1 | 2/2005 | Yim et al. | |
| 2005/0091579 A1 * | 4/2005 | Mewherter et al. | 715/513 |
| 2006/0242180 A1 * | 10/2006 | Graf et al. | 707/101 |
| 2007/0277101 A1 * | 11/2007 | Barber et al. | 715/539 |
| 2008/0092051 A1 * | 4/2008 | Sidon et al. | 715/731 |
| 2009/0125804 A1 * | 5/2009 | Brown et al. | 715/239 |

(Continued)

FOREIGN PATENT DOCUMENTS

WO    WO 2009026159 A1 *    2/2009    .......... G11B 27/034

OTHER PUBLICATIONS

Putnik et. al. "A Practical Model for Conversion of Existing Teaching Resources into Learning Objects", MASAUM Journal of Computing, vol. 1 Issue 2, Sep. 2009, pp. 205-213.

(Continued)

*Primary Examiner* — Scott Baderman
*Assistant Examiner* — Barbara Level
(74) *Attorney, Agent, or Firm* — Daniel R. Simek

(57) ABSTRACT

One embodiment of the present invention discloses a method, computer program product, and system for converting a Microsoft® PowerPoint® file to Darwin Information Typing Architecture (DITA). A document converter receiving a command from a client device to convert one or more PowerPoint slides to DITA, wherein the PowerPoint has been formatted for conversion to DITA. Starting with the first PowerPoint slide, metadata tags, PowerPoint slide and notes text, and file names of grouped images are compiled into a string parsed with DITA markup. If the next slide does not begin a new topic, then that slide's metadata tags, PowerPoint slide and notes text, and grouped image file names are compiled into a string parsed with DITA markup and appended to the previous slides string. If the next slide begins a new topic, then the string is exported to a DITA topic. This process is repeated throughout the PowerPoint presentation.

12 Claims, 6 Drawing Sheets

(56) References Cited

U.S. PATENT DOCUMENTS

| | | | |
|---|---|---|---|
| 2009/0183066 A1* | 7/2009 | Crawford et al. | 715/231 |
| 2009/0193036 A1* | 7/2009 | Petri | 707/100 |
| 2009/0210796 A1* | 8/2009 | Bhogal et al. | 715/730 |
| 2009/0210861 A1* | 8/2009 | Alupului | 717/123 |
| 2010/0114985 A1* | 5/2010 | Chaudhary et al. | 707/803 |
| 2010/0153839 A1* | 6/2010 | Wilkins | 715/235 |
| 2011/0161348 A1* | 6/2011 | Oron | 707/769 |
| 2013/0326336 A1* | 12/2013 | Lanque et al. | 715/234 |

OTHER PUBLICATIONS

"DITA Exhange PowerPoint Publishing," Content Technologies, Denmark, Mar. 21, 2010, two (2) pages.

"Embedding iSpring Courses into DITA Learning Content," iSpring Solutions, Inc., Copyright @ 2005-2012, Date printed Oct. 12, 2012. <http://www.ispringsolutions.com/articles/embedding_ispring_into_dita.html>.

* cited by examiner

SLIDE INFORMATION GATHERING
SAMPLE ALGORITHM
── 400

```
For Each oSh In oShapes
    With oSh
        'If it's a ppPlaceholderBody, get its text
        If .Type = msoPlaceholder Then
            If .PlaceholderFormat.Type = ppPlaceholderBody Then
                Set oTextRange = oSh.TextFrame.TextRange
                'Substitute character codes for special characters
                Set oTextRange = dita_SubstituteCharCodes(oTextRange)
                With dita_DeleteEmptyPars(oSh, oTextRange)
                    'Parse each paragraph to build str_slideBodyText and including DITA elements
                    Set oTextRange = oSh.TextFrame.TextRange
                    'Call dita_ParseParagraph(oTextRange)

Select Case str_ditaTopicType
                        Case "Concept"
                            str_slideBodyText = dita_ParseParagraph(oTextRange)
                        Case "Task"
                            str_slideBodyText = dita_ParseParagraphTask(oTextRange)
                        Case "Reference"
                            str_slideBodyText = dita_ParseParagraph(oTextRange)
                    End Select
                    str_parsedParagraph = str_parsedParagraph & vbCrLf & str_slideBodyText
                End With
            End If
        End If
    End With
Next 'oSh Shape
For Each oSh In oShapes
    With oSh
        If .Type = msoPicture Or .Type = msoGroup Then
            With .Tags
                For i = 1 To .Count
                    If .Name(i) = "FILENAME" Then
                        str_imageFileName = .Value(i)
                        If oSh.AlternativeText <> "" Then
                            str_imageAltText = oSh.AlternativeText
                        Else
                            str_imageAltText = "place image alt text here"
                        End If
                        bln_ditaImageFound = True
                    End If
                Next 'i Tag
            End With
        End If
    End With
```

FIG. 4

NEW TOPIC IDENTIFICATION
SAMPLE ALGORITHM
— 500

```
Dim x As Integer
Dim bln_ditaTopicFound As Boolean

With oSlideDITA.Tags
      For x = 1 To .Count
         If .Name(x) = "DITA_TOPIC_TYPE" Then
            bln_ditaTopicFound = True
            Exit For
         End If
         If .Name(x) = "DITA_TOPIC_TITLE" Then
            bln_ditaTopicFound = True
            Exit For
         End If
         If .Name(x) = "DITA_TOPIC_FILE_NAME" Then
            bln_ditaTopicFound = True
            Exit For
         End If
      Next ' x Tag
   End With If bln_ditaTopicFound = True Then
      dita_IsNewTopic = True
   End If End Function
```

FIG. 5

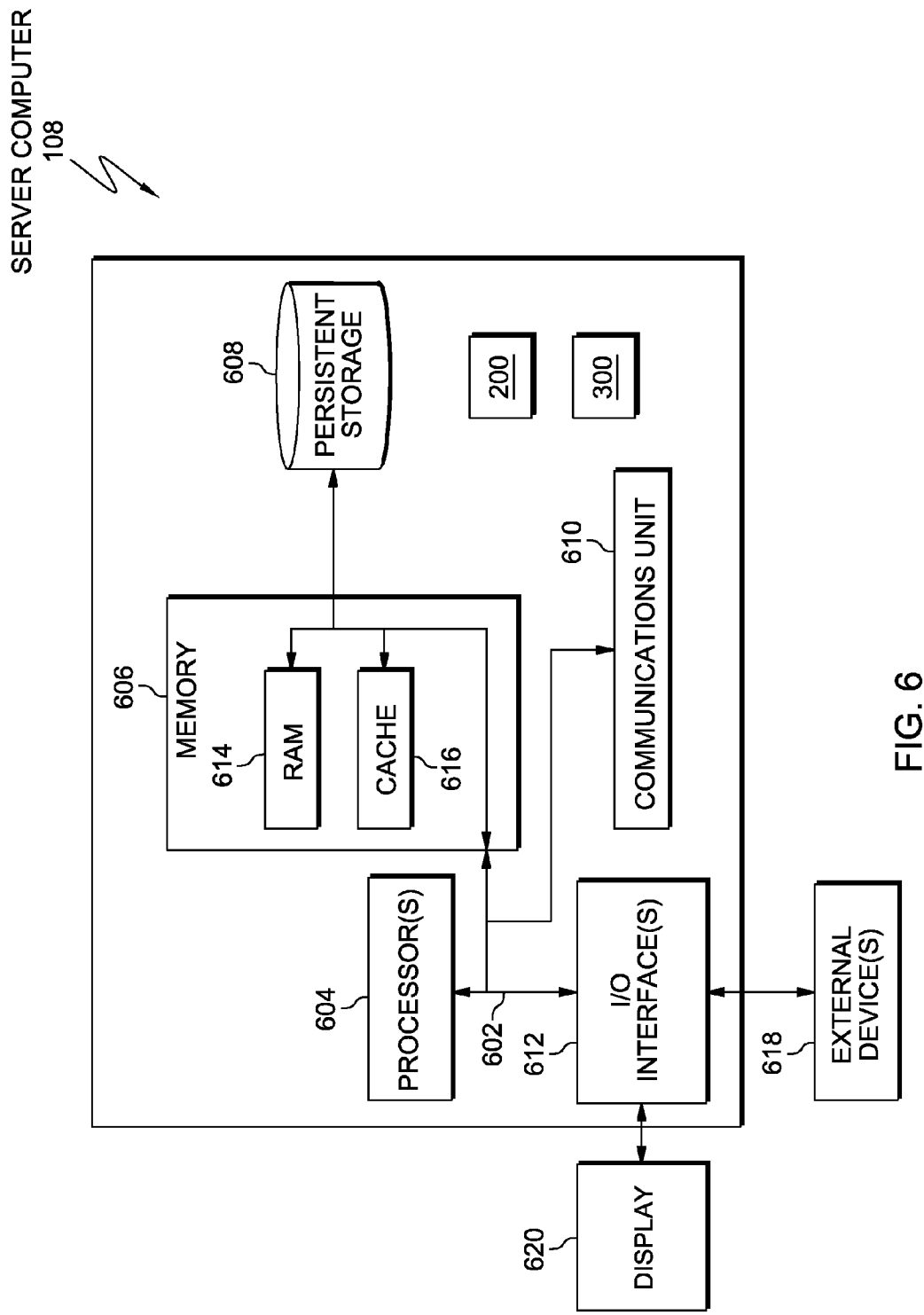

US 9,256,582 B2

CONVERSION OF A PRESENTATION TO DARWIN INFORMATION TYPING ARCHITECTURE (DITA)

FIELD OF THE INVENTION

The present invention relates generally to the field of document conversion software and more particularly to converting a Microsoft® PowerPoint® file to Darwin Information Typing Architecture (DITA).

BACKGROUND OF THE INVENTION

PowerPoint® is a file format of presentation software created by Microsoft®. A PowerPoint presentation consists of a number of individual pages or "slides" which are populated with information. The slides may contain text, notes, graphics and images, movies, sound, or other objects.

The Darwin Information Typing Architecture (DITA) is a standard Extensible Markup Language (XML) data model which is used for authoring and publishing content. DITA content is created by dividing information into topic items. There are three basic topic types: Task, Concept, and Reference. The topics are organized with a title element, elements of metadata, and a body element which is comprised of information relating to the specific topic. The metadata in DITA includes information and attributes about the topic which makes it easier to locate.

SUMMARY

One embodiment of the present invention discloses a method, computer program product, and system for converting a Microsoft® PowerPoint® file to Darwin Information Typing Architecture (DITA). A document converter receiving a command from a client device to convert one or more PowerPoint slides to DITA, wherein the PowerPoint has been formatted for conversion to DITA. Starting with the first PowerPoint slide, metadata tags, PowerPoint slide and notes text, and file names of grouped images are compiled into a string parsed with DITA markup. If the next slide does not begin a new topic, then that slide's metadata tags, PowerPoint slide and notes text, and grouped image file names are compiled into a string parsed with DITA markup and appended to the previous slides string. If the next slide begins a new topic, then the string is exported to a DITA topic. This process is repeated throughout the PowerPoint presentation.

BRIEF DESCRIPTION OF THE SEVERAL VIEWS OF THE DRAWINGS

FIG. 4 depicts a slide information gathering sample algorithm in accordance with an embodiment of the automated conversion program from FIG. 3.

FIG. 5 depicts a new topic identification sample algorithm in accordance with an embodiment of the automated conversion program.

FIG. 6 depicts a block diagram of components of the server computer 108 executing the PowerPoint formatting program and automated conversion program, in accordance with an embodiment of the present invention.

DETAILED DESCRIPTION

Figure 1:
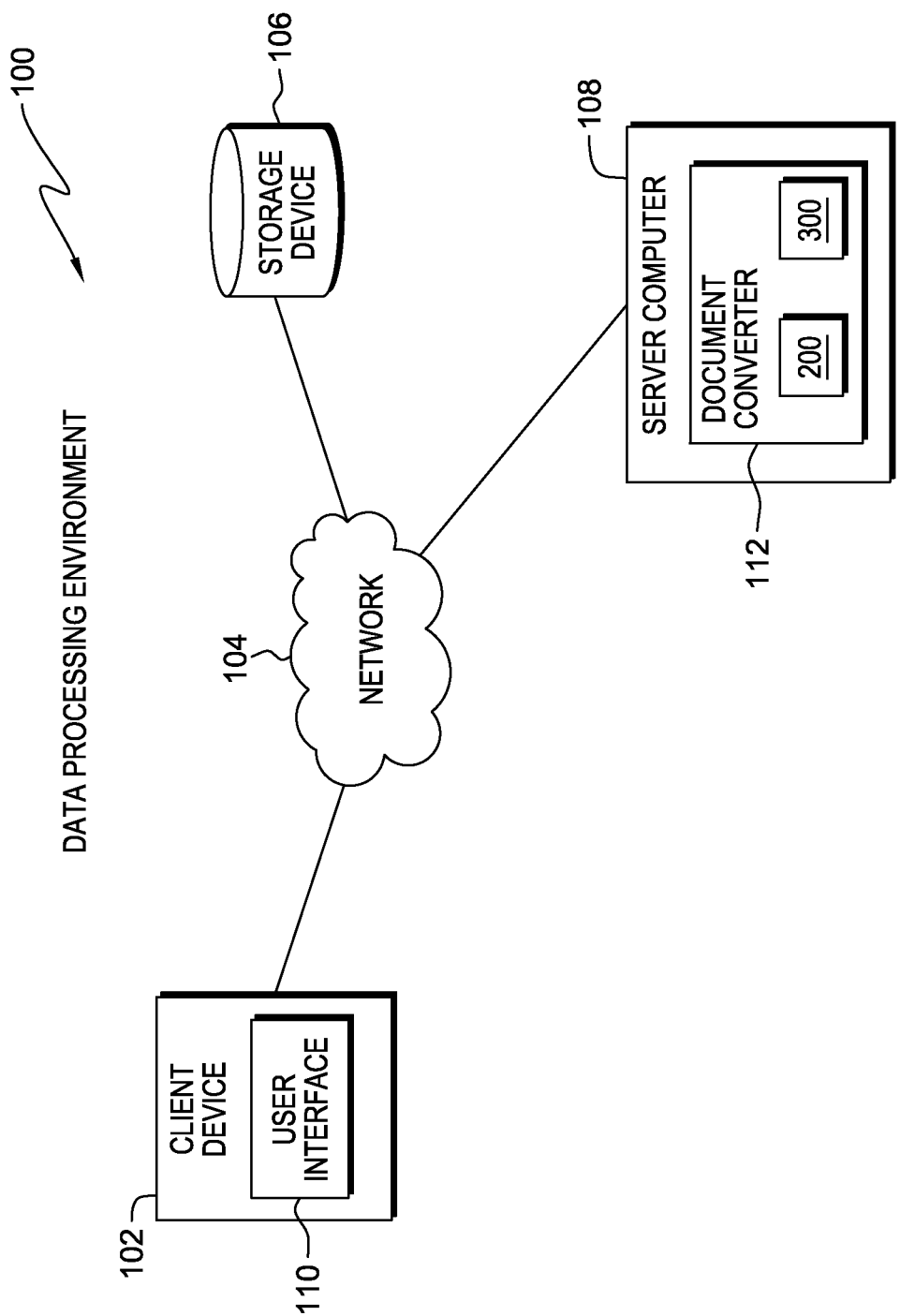
FIG. 1 is a pictorial representation of a distributed data processing environment in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a data processing environment 100 in accordance with one embodiment of the present invention.

Data processing environment 100 includes a client device 102, a storage device 106, and a server computer 108 which are connected through a network 104. Client device 102 may be a workstation, personal computer, personal digital assistant, mobile phone, or other devices capable of executing program instructions. A user interface 110 is located on client device 102 and may exist in the form of operating system software, which may be Windows®, LINUX®, or other systems that include application software such as internet applications and web browsers. In an embodiment, user interface 110 includes applications which utilize network 104 to access content on storage device 106 or server computer 108.

In an embodiment, data processing environment 100 includes network 104, which provides communication between devices such as, but not limited to client device 102, storage device 106, and server computer 108. Network 104 may include connections such as wiring, wireless communication link, fiber optic cables, and other forms of communication. Network 104 may allow elements of data processing environment 100 to access content through a plurality of methods, including the internet, an intranet connection, telecommunications service provider, local area connection, and others.

Storage device 106 may represent any type of storage which is capable of storing data which may be accessed and utilized by client device 102 and server computer 108, including a database server, a hard drive on a computing device, flash memory, an external storage device, or other means of data storage. As depicted, storage device 106 is a networked storage device accessible via network 104. In an alternative embodiment, storage device 106 may be located on client device 102 as a component of client device 102. In an example, storage device 106 may be a repository for product information and product instructions which may be accessed by documentation developers and training developers. In another example, storage device 106 may be a repository database consisting of content such as Microsoft PowerPoint presentations, and Darwin Information Typing Architecture (DITA) documents which may be accessed by client device 102 and server computer 108.

A document converter program 112 is located on server computer 108 and can access and convert content located on storage device 106 responsive to a command from client device 102. In an embodiment, document converter program 112 can convert Microsoft PowerPoint presentations into DITA documents. In the depicted embodiment, document converter program 112 is located on server computer 108 in the form of an application. In another embodiment, document converter program 112 may be located on client device 102. Server computer 108 may be any programmable electronic device as described previously with respect to client device 102. In one embodiment, server computer 108 represents a "cloud" of computers interconnected by one or more networks, where server computer 108 is a primary server for a computer system utilizing clustered computers and components to act as a single pool of seamless resources when accessed through network 104. For example, this implementation may be preferred for data centers and for cloud computing applications Embodiments of the present invention recognize that documentation developers who produce product support information and training developers who produce end user training documents often end up duplicating each others work. Since both are writing for an end user audience, a common repository for product information and product instructions could reduce the duplication of documentation. However, to utilize each others information in such a repository effectively, a common file format should be used.

The Darwin Information Typing Architecture (DITA) supports a single sourcing of content. DITA has been widely used by documentation teams, however it is not widely used on training development teams. A large volume of current training content exists in the form of Microsoft PowerPoint presentations rather than DITA. This means that a large amount of training content exists in a format different than a widely used format for the product support documentation. A means to convert Microsoft PowerPoint presentations to DITA documents would allow training documents to be converted into the same format as product support documents, which would allow documentation developers and training developers to utilize each others information effectively. Document converter program 112 includes a PowerPoint formatting program 200 for preparing a Microsoft PowerPoint presentation so that it may be converted to a DITA document. In one embodiment, document converter program 112 also includes an automated conversion program 300 for converting a Microsoft PowerPoint presentation to a DITA document. A person of ordinary skill in the art will recognize that the software described herein will be applicable for any type of presentation software. Document converter program 112, PowerPoint formatting program 200, and automated conversion program 300 may be stored on server computer 108 in the form of program instructions. However, in other examples, the programs may be stored on remote storage devices (e.g., storage device 106), servers, or networked computer systems. Detailed implementation of programs 200 and 300 are discussed with regard to FIGS. 2 and 3 respectively.

Server computer 108 may include internal and external hardware components, as depicted and described in further detail with respect to FIG. 6.

Figure 2:
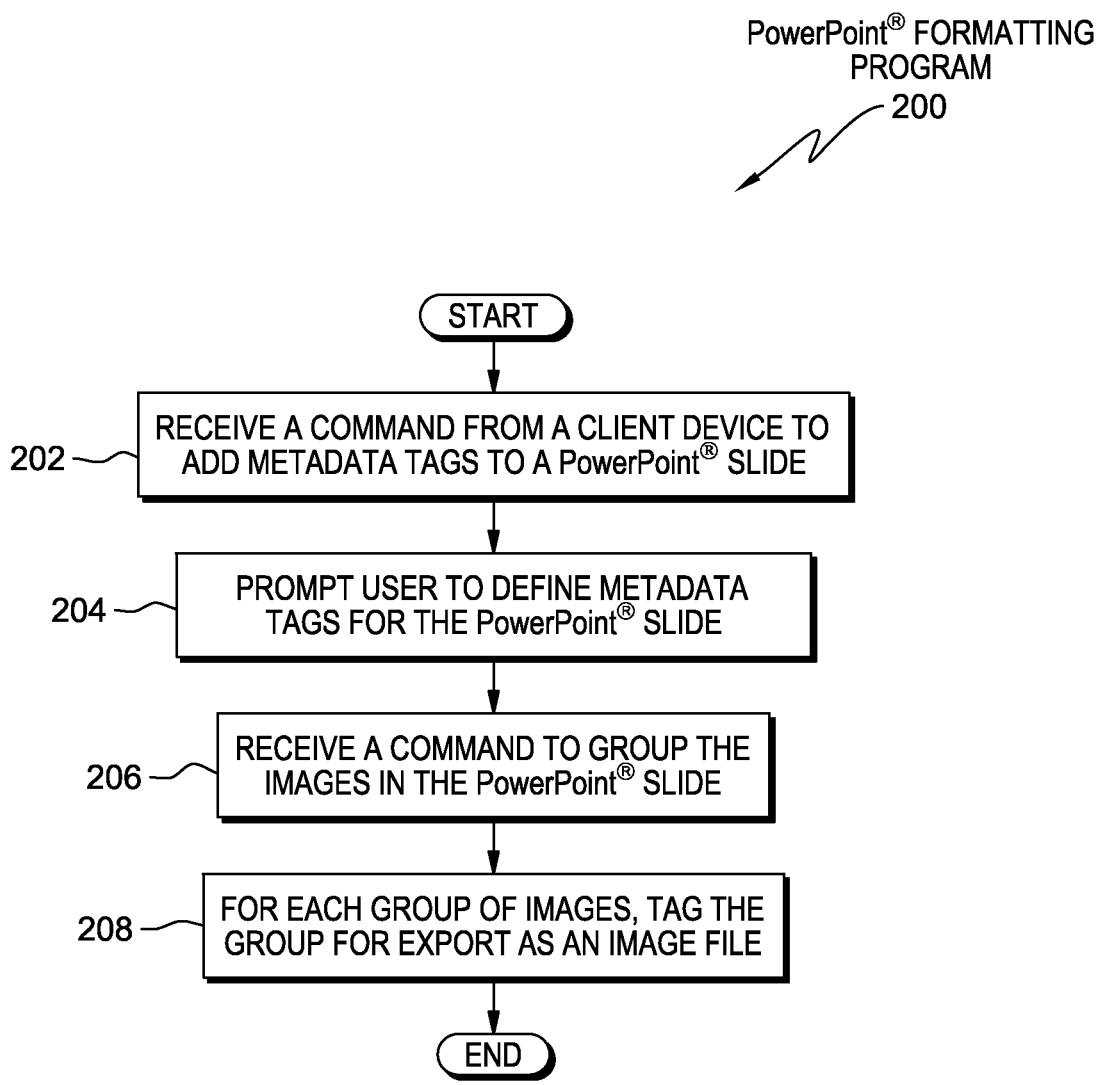
FIG. 2 is a flowchart depicting operational steps of a program for formatting a Microsoft PowerPoint presentation so that it may be converted to a DITA document in accordance with an embodiment of the present invention.

FIG. 2 is a flowchart depicting operational steps of PowerPoint formatting program 200. In one embodiment, PowerPoint formatting program 200 prepares a PowerPoint slide to be converted to a DITA document responsive to user specifications.

In step 202, PowerPoint formatting program 200 receives a command from client device 102 to add metadata tags to a PowerPoint slide. The command to add metadata tags to a PowerPoint slide may be accomplished through a user input in a user form activated by clicking a button on a PowerPoint add-in toolbar. In step 204, PowerPoint formatting program 200 prompts a user to define metadata tags for the PowerPoint slide. The metadata tags defined in step 204 may be marking the concept, task, and reference topic types which are used in DITA. When the user is prompted to define the metadata tags for the slide, the user may define the appropriate topic title and topic file name for the slide, and then decide whether the topic is a concept, task, or reference. Responsive to the user definition from step 204, the PowerPoint slide is tagged with the appropriate metadata, which prepares the slide for conversion through automated conversion program 300. In an embodiment, step 202 may also be a command to edit metadata tags which have been previously defined by the user.

In step 206, PowerPoint formatting program 200 receives a command to group images in the PowerPoint slide. In an example, the command to group the images in a PowerPoint slide comes from a user on client device 102. The selection of images to group in step 206 may be accomplished by the user selecting the desired component graphic elements on the slide and then selecting the group image command in a PowerPoint add-in toolbar. In an embodiment, the images grouped may be graphical elements of diagrams such as lines, arrows and boxes. The grouping of images allows the original arrangement of the images to be preserved when converting the slide to DITA. Subsequent to the images being grouped responsive to the user command in step 206, the image group is then ready to be exported as an image file in automated conversion program 300. In one embodiment, when the images are grouped in step 206, PowerPoint formatting program 200 adds a bottom layer to the group of images and the group is tagged as a composite image to be exported as a single image file. The addition of the bottom layer to the group of images may be used to provide a uniform background to the group of images which does not obscure any of the elements of the group of images. The command to group the images in a PowerPoint slide in step 206 may be accomplished through a user input in a PowerPoint add-in toolbar. PowerPoint formatting program 200 tags each group of images for export as an image file (step 208). In an embodiment, in step 208 each group of images is tagged with metadata that defines the file name for the image file to be exported/created and flags the group to be exported to a single image file by the automated conversion program 300. In an example where a PowerPoint presentation is comprised of more than one slide, PowerPoint formatting program 200 may be repeated for every slide in the PowerPoint presentation.

Figure 3:
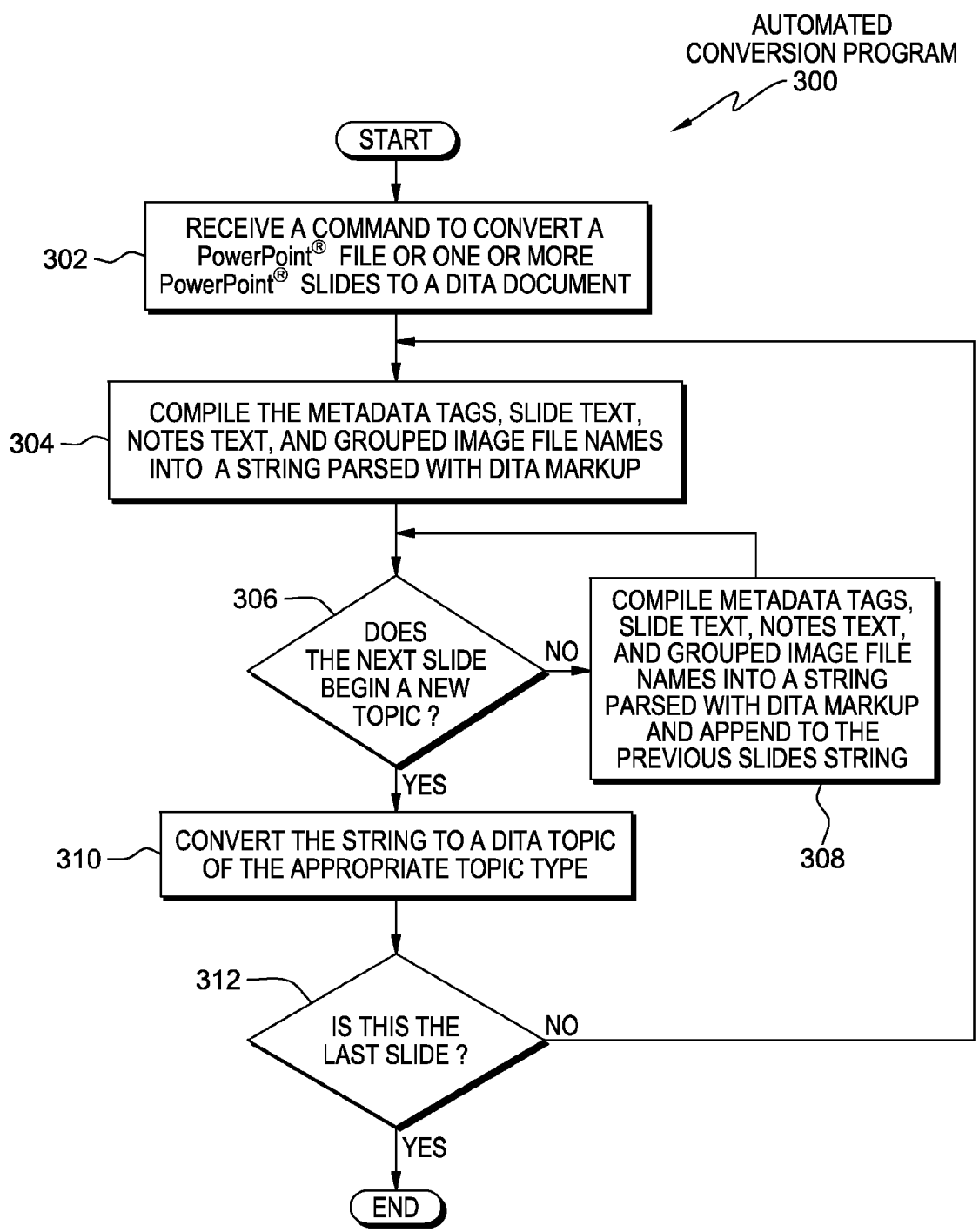
FIG. 3 illustrates operational steps of a program for the automated conversion of a Microsoft PowerPoint presentation to a DITA document, in accordance with an embodiment of the present invention.

FIG. 3 is a flowchart depicting operational steps of automated conversion program 300. Automated conversion program 300 may be initiated after PowerPoint formatting program 200 has been completed for each slide in the PowerPoint. In one embodiment, automated conversion program 300 converts a Microsoft PowerPoint presentation to a DITA document.

In step 302, automated conversion program 300 receives a command to convert a PowerPoint file or one or more PowerPoint slides to a DITA document. In an example, the command to convert a PowerPoint file to DITA in step 302 may be accomplished through a user input in a PowerPoint add-in toolbar. In step 304, automated conversion program 300 compiles the metadata tags, PowerPoint slide text, PowerPoint slide notes text, and grouped image file names into a string parsed with DITA markup for a slide in the PowerPoint file. The metadata tags contain at least in part a topic title, topic file name, and topic type. In an example, the image file names compiled in step 304 of automated conversion program 300 are the grouped image file names which were tagged for export in step 208 of PowerPoint formatting program 200. An example of an image file format which the group of images may be saved as is a JPEG image file. In an embodiment, the PowerPoint slide text compiled in step 304 may be the text in the body of the PowerPoint slide or text in other place holders in the PowerPoint slide. The PowerPoint notes text compiled in step 304 may be the text in the notes section of the PowerPoint slide.

In step 306, automated conversion program 300 determines whether the next slide is the beginning of a new topic. The determination that the next slide is the beginning of a new topic in step 306 may be accomplished through accessing metadata tags which were assigned to the slide in step 204 of PowerPoint formatting program 200. If automated conversion program 300 determines that the next slide does not begin a new topic (no branch of decision block 306), automated conversion program 300 compiles the metadata tags, PowerPoint slide text, PowerPoint slide notes text, and grouped image file names for the slide into a string parsed with DITA markup and appends the information to the previous slides string (step 308). If automated conversion program 300 determines that the next slide is the beginning of a new topic (yes branch of decision block 306), automated conversion program 300 converts the string to a DITA topic of the appropriate topic type (step 310). The appropriate topic type from step 310 can be defined in step 204 of PowerPoint formatting program 200.

In step 312, automated conversion program 300 determines whether the slide which was previously converted was the last slide. If automated conversion program 300 determines that it was not the last slide (no branch of decision block 312), automated conversion program 300 repeats, starting at step 304 for the new slide. If automated conversion program 300 determines that it was the last slide (yes branch of decision block 312), then automated conversion program 300 is completed. In an embodiment, step 312 ensures that automated conversion program 300 repeats for each slide in a PowerPoint file. An exemplary result of automated conversion program 300 may be each slide in a PowerPoint presentation is converted and organized into a DITA topic and formatted so that the file may be opened in a DITA authoring or viewing program.

FIG. 4 depicts a slide information gathering sample algorithm 400 that gathers and compiles information from a PowerPoint slide in accordance with an embodiment of automated conversion program 300. In an embodiment, slide information gathering sample algorithm 400 compiles at least in part metadata tags, PowerPoint slide text, PowerPoint notes text, and grouped image file names.

FIG. 5 depicts a new topic identification sample algorithm 500 that determines whether or not a PowerPoint slide contains the beginning of a new topic in accordance with an embodiment of automated conversion program 300.

FIG. 6 depicts a block diagram of components of server computer 108 in accordance with an illustrative embodiment. It should be appreciated that FIG. 6 provides only an illustration of one implementation and does not imply any limitations with regard to the environment in which different embodiments may be implemented. Many modifications to the depicted environment may be made.

Server computer 108 includes communications fabric 602, which provides communications between computer processor(s) 604, memory 606, persistent storage 608, communications unit 610, and input/output (I/O) interface(s) 612.

Memory 606 and persistent storage 608 are examples of computer-readable tangible storage devices and media. Memory 606 may be, for example, one or more random access memories (RAM) 614, cache memory 616, or any other suitable volatile or non-volatile storage device.

PowerPoint formatting program 200 and automated conversion program 300 are stored in persistent storage 608 for execution by one or more of the respective computer processors 604 via one or more memories of memory 606. In the embodiment illustrated in FIG. 6, persistent storage 608 includes flash memory. Alternatively, or in addition to flash memory, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices, including resources of client device 102, network 104 and storage device 106. In these examples, communications unit 610 includes one or more network interface cards. Communications unit 610 may provide communications through the use of either or both physical and wireless communications links. PowerPoint formatting program 200 and automated conversion program 300 may be downloaded to persistent storage 608 through communications unit 610.

I/O interface(s) 612 allows for input and output of data with other devices that may be connected to server computer 108. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for converting a presentation file to Darwin Information Typing Architecture (DITA), the computer program product comprising:
   one or more computer-readable tangible storage devices and program instructions stored on the one or more computer-readable tangible storage devices, the program instructions comprising:
   prior to receiving a command to convert one or more presentation slides to a DITA document, program instructions to receive a command to group graphical elements located on a presentation slide;
   responsive to receiving the command to group graphical elements located on the presentation slide, program instructions to assign metadata tags to the grouped graphical elements, the metadata tags comprising at least in part a file name for the group of graphical elements and an indication that the group is to be exported to a single image file;
   program instructions to receive a command to convert one or more presentation slides to a DITA document, wherein the one or more presentation slides to be converted have been tagged with metadata corresponding to topic type and grouped graphical element file names;
   program instructions responsive to receiving the command to convert one or more presentation slides to a DITA document, to compile information from the presentation slide, the information selected from the group consisting of the metadata tags, text in the presentation slide, text in a notes section of the presentation slide, and grouped graphical element file names from a first presentation slide of the one or more presentation slides into a string parsed with DITA markup;
   program instructions to access the metadata tags for a second presentation slide and determining whether the second presentation slide is a new topic;
   program instructions to determine that the second presentation slide is a new topic; and
   program instructions responsive to determining that the second presentation slide is a new topic, to convert the string parsed with DITA markup to a DITA topic defined by the metadata in the presentation slide.

2. The computer program product of claim 1, further comprising program instructions, stored on the one or more computer-readable tangible storage devices, to:
   determine that a third presentation slide is not a new topic; and responsive to determining that the third presentation slide is not the beginning of a new topic, compile metadata tags, text in the presentation slide, text in the notes section of the presentation slide, and grouped graphical element file names into a string parsed with DITA markup and append to the string of the second presentation slide.

3. The computer program product of claim 1, further comprising program instructions, stored on the one or more computer-readable tangible storage devices, to:

prior to the command to convert one or more presentation slides to a DITA document, receive a command to add metadata tags to a presentation slide;

responsive to receiving the command to add metadata tags to a presentation slide, prompt a user to define metadata tags for the presentation slide; and responsive to the user defining metadata tags for the presentation slide, assign the defined metadata tags to the presentation slide, the defined metadata tags comprising at least in part topic type, topic title and topic file name.

4. The computer program product of claim 1, wherein the program instructions to determine that the second presentation slide is a new topic is based on accessing the topic type, topic title, and topic file name located in the metadata of the second presentation slide.

5. The computer program product of claim 1, wherein the command to convert one or more presentation slides to a DITA document is received as user input in a presentation add-in toolbar.

6. The computer program product of claim 1, further comprising program instructions, stored on the one or more computer-readable tangible storage devices, to:

prior to the command to convert one or more presentation slides to a DITA document, receive a command to edit metadata tags corresponding to a presentation slide;

responsive to receiving the command to edit metadata tags corresponding to a presentation slide, prompt a user to define metadata tags for the presentation slide; and responsive to the user defining metadata tags and for the presentation slide, assign the defined metadata tags to the presentation slide, the defined metadata tags comprising at least in part topic type, topic title and topic file name.

7. A computer system for converting presentation file to Darwin Information Typing Architecture (DITA), the computer system comprising:

one or more computer processors;

one or more computer-readable tangible storage devices;

program instructions stored on the one or more computer-readable tangible storage devices for execution by at least one of the one or more processors, the program instructions comprising:

prior to receiving a command to convert one or more presentation slides to a DITA document, program instructions to receive a command to group graphical elements located on a presentation slide;

responsive to receiving the command to group graphical elements located on the presentation slide, program instructions to assign metadata tags to the grouped graphical elements, the metadata tags comprising at least in part a file name for the group of graphical elements and an indication that the group is to be exported to a single image file;

program instructions to receive a command to convert one or more presentation slides to a DITA document, wherein the one or more presentation slides to be converted have been tagged with metadata corresponding to topic type and grouped graphical element file names;

program instructions responsive to receiving the command to convert one or more presentation slides to a DITA document, to compile information from the presentation slide, the information selected from the group consisting of the metadata tags, text in the presentation slide, text in a notes section of the presentation slide, and grouped graphical element file names from a first presentation slide of the one or more presentation slides into a string parsed with DITA markup;

program instructions to access the metadata tags for a second presentation slide and determining whether the second presentation slide is a new topic;

program instructions to determine that the second presentation slide is a new topic; and program instructions responsive to determining that the second presentation slide is a new topic, to convert the string parsed with DITA markup to a DITA topic defined by the metadata in the presentation slide.

8. The computer system of claim 7, further comprising program instructions, stored on the one or more computer-readable tangible storage devices for execution by at least one of the one or more processors, to:

determine that a third presentation slide is not a new topic; and responsive to determining that the third presentation slide is not the beginning of a new topic, compile metadata tags, text in the presentation slide, text in the notes section of the presentation slide, and grouped graphical element file names into a string parsed with DITA markup and append to the string of the second presentation slide.

9. The computer system of claim 7, further comprising program instructions, stored on the one or more computer-readable tangible storage devices for execution by at least one of the one or more processors, to:

prior to the command to convert one or more presentation slides to a DITA document, to receive a command to add metadata tags to a presentation slide;

responsive to receiving the command to add metadata tags to a presentation slide, to prompt a user to define metadata tags and for the presentation slide; and responsive to a user defining metadata tags for the presentation slide, to assign the defined metadata tags to the presentation slide, the defined metadata tags comprising at least in part topic type, topic title and topic file name.

10. The computer system of claim 7, wherein the program instructions to determine that the second presentation slide is a new topic is based on accessing the topic type, topic title, and topic file name located in the metadata of the second presentation slide.

11. The computer system of claim 7, wherein the command to convert one or more presentation slides to a DITA document is received as a user input in a presentation add-in toolbar.

12. The computer system of claim 7, further comprising program instructions, stored on the one or more computer-readable tangible storage devices for execution by at least one of the one or more processors, to:

prior to the command to convert one or more presentation slides to a DITA document, to receive a command to edit metadata tags corresponding to a presentation slide;

responsive to receiving the command to edit metadata tags corresponding to a presentation slide, to prompt a user to define metadata tags for the presentation slide; and responsive to a user defining metadata tags for the presentation slide, to assign the defined metadata tags to the presentation slide, the defined metadata tags comprising at least in part topic type, topic title and topic file name.

\* \* \* \* \*